Patented Jan. 4, 1944

2,338,283

UNITED STATES PATENT OFFICE 2,338,283

GRADING MACHINE

Joseph Gouldbourn and Charles Harold Heather, Leicester, England, assignors to United Shoe Machinery Corporation, Borough of Flemington, N. J., a corporation of New Jersey Application May 21, 1941, Serial No. 394,532
In Great Britain June 12, 1940

13 Claims. (Cl. 69—11)

This invention relates to grading machines which operate upon or with respect to a piece of work in accordance with the thickness of the thinnest portion of a selected locality thereof, and is herein illustrated as embodied in a machine for splitting or evening soles for use in the manufacture of boots and shoes.

Machines of this general type commonly comprise measuring mechanism, operating mechanism and mechanism for adjusting the operating mechanism in accordance with the thickness of the thinnest portion of the work encountered by the measuring mechanism. The unit of measurement of the thickness of soles is $\frac{1}{48}$ of an inch, and it is desirable that the operating mechanism be adjusted accurately to within half that unit, the general object of the present invention being to increase the sensitiveness of the measuring mechanism and the accuracy of the adjusting mechanism.

According to one feature of the invention the adjusting mechanism includes fluid-operated means actuated by the measuring mechanism. In the illustrated machine the operating mechanism, which is a splitting mechanism, is adjusted by means including a fluid-operated piston, the movements of which are caused by movements of a fluid-operated valve, whose movements in turn are controlled by the measuring mechanism. With the above mechanism the measurements of the measuring mechanism control with great accuracy the adjustments of the operating mechanism.

In order to increase the sensitiveness of the measuring mechanism, there is provided, in accordance with another feature of the invention, a measuring roll over which the work passes, said roll being capable of bodily and of endwise tilting movements, and means for engaging the roll at a locality substantially equidistant from its ends for rotating it. In the illustrated construction the roll is hollow with the rotating mechanism located within it, and is yieldingly supported by a rod which extends at right angles to the roll and in line with the rotating mechanism.

These and other features of the invention, including certain details of construction and combinations of parts, will be described as embodied in an illustrative machine and pointed out in the appended claims.

Referring to the accompanying drawings.

Figure 3:
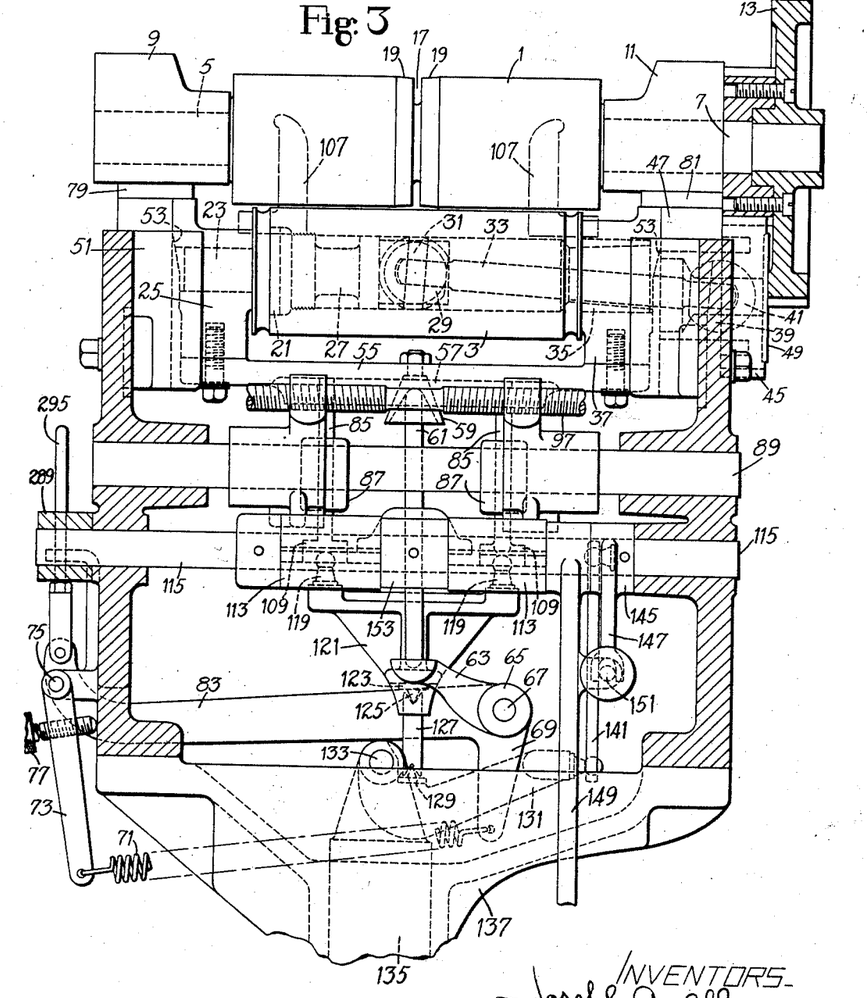
Fig. 3 is a front elevation, partly in section, of the mechanism shown in Fig. 2.

The illustrative machine includes a pair of rolls 1, 3 (Fig. 3) at the front of the machine which measure the thickness of each workpiece fed to the machine as it is passing between the rolls, a pair of splitting rolls 2, 4 (Fig. 1) at the rear of the machine which feed each workpiece to a splitting knife 6, and mechanism which transfers the measurement of each workpiece, as determined by the measuring rolls, to mechanism at the rear of the machine which controls the splitting rolls and causes each workpiece to be evened to the thickness of the thinnest portion thereof as determined by the measuring rolls. The lower splitting roll is normally held up against stops (not shown) by a heavy spring. The upper splitting roll is adjustable vertically and is unyielding, the distance between the lower element of the roll and the edge of the knife determining the thickness to which the workpiece will be split or evened. The upper splitting roll 2 is adjusted vertically through mechanism (not shown) in accordance with the position of an adjusting or setting slide 8 which is slidable toward and away from the observer. The adjusting slide is actuated by a pinion 10 at the upper end of a rotary spindle 12, on the lower end of which is a second pinion 14 which is rotated by the sliding movements of a second horizontal rack-bar 16, this rack-bar being moved in accordance with the measurements of the workpiece by the measuring rolls and being finally moved into a position determined by the thinnest portion in a selected locality of the workpiece. Machines of the type described above are well known, one for example being shown in United States Letters Patent No. 1,703,955, granted March 5, 1929, upon an application filed in the name of William T. B. Roberts. Machines of this general type are known which not only split the workpieces but mark and/or sort them or which visually indicate their thicknesses as measured by the measuring roll. The splitting mechanism of the illustrative machine is representative of any mechanism which acts upon or with respect to the workpieces in accordance with their thicknesses.

Figures 1, 9:
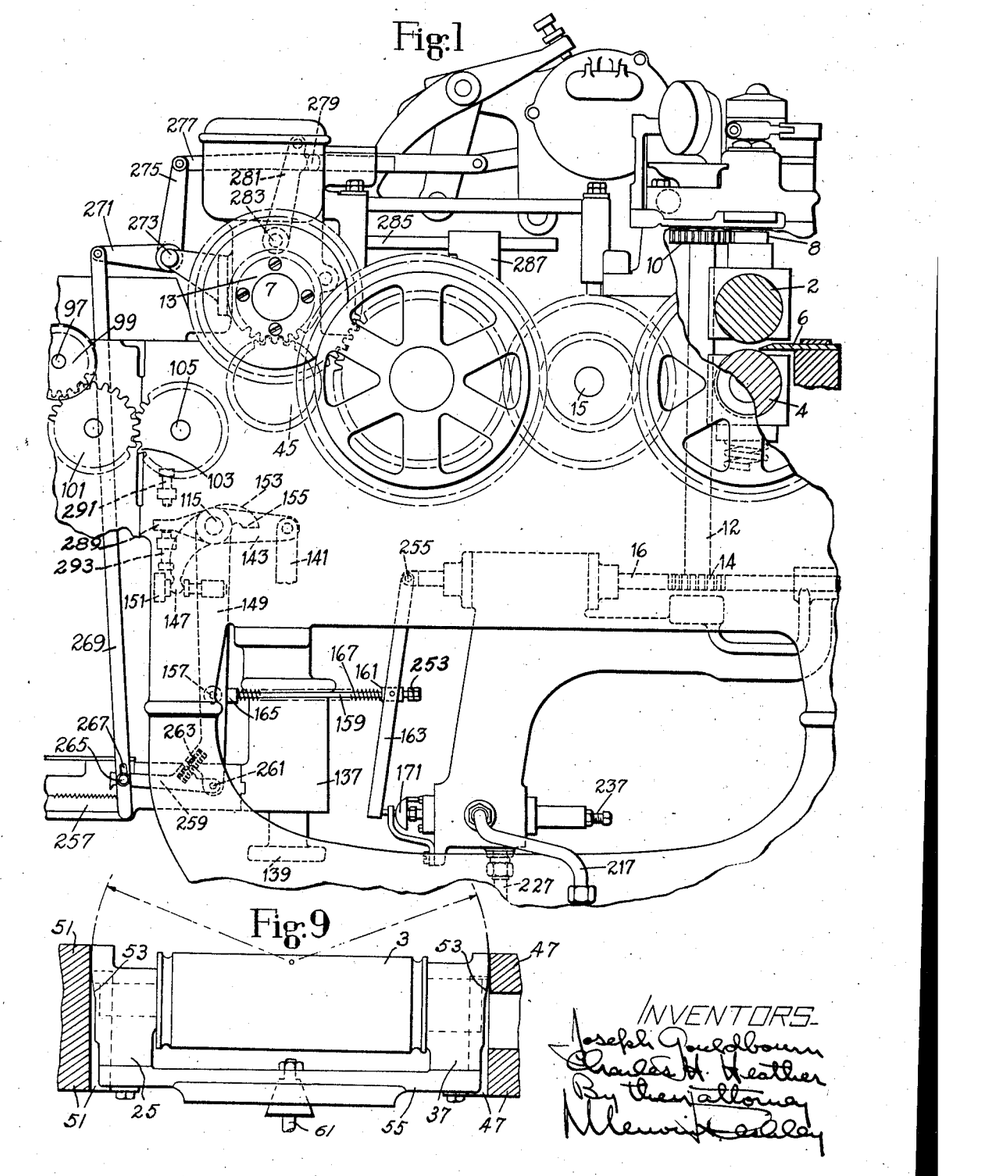
Fig. 1 is a right-hand side elevation of a portion of the illustrative machine.
Fig. 9 is a front view of the measuring roll and its bearings, the stationary blocks in which the bearings are mounted being shown in vertical longitudinal section.

What is new in the illustrative machine will now be described. The measuring members comprise an upper unyielding roll 1 and a lower measuring roll 3 arranged directly beneath the upper roll. Trunnions 5 and 7 at opposite ends of the upper roll 1 are rotatably mounted in bearings 9 and 11 at each end of the roll which are secured in side portions of the machine frame. The upper roll 1 is driven continually, while the machine is being driven, by a spur-gear 13 secured on its right-hand end which is in turn driven by gearing from a driving shaft of the machine 15 (Fig. 1). The centre portion of the peripheral face of the upper roll has formed in it a groove 17 about one-eighth of an inch wide and about half an inch deep, and the peripheral face at each side of the groove is bevelled slightly at 19, the bevelled portion 19 at each side of the groove 17 being about five-sixteenths of an inch wide. The centre portion of the upper roll is thus reduced in diameter, the reduced portion being about three-quarters of an inch wide, with the result that the centre portion of a workpiece can enter the slightly reduced portion and allow the portions of the workpiece at each side of the centre portion to be pressed against the upper roll by the lower roll 3 even if the centre portion of the workpiece is slightly thicker than the side portions which it is desired to measure. The measuring roll 3 has a knurled peripheral face, and the peripheral face of the upper roll 1 smooth.

The measuring roll 3 is axially bored and the bore at the left-hand end of the roll has secured in it a plug 21 which has extending from the left of it a trunnion 23, said trunnion being rotatably mounted in a bearing 25 for the left-hand end of the roll. Within the bore in the measuring roll and at the right of the plug 21 is secured one part 27 of a universal coupling. The right-hand end of the part 27 of the universal coupling is recessed lengthwise of the part, and the recess has in it a disc 29 the axis of which extends across the axis of the roll at the centre of the roll. The disc 29 is about half an inch thick, and its diameter is very slightly less than the diameter of the bore in the lower roll. The disc 29 has formed across it a recess which extends (Fig. 3) to the left from the right-hand edge of the disc inwardly beyond the centre of the disc. A pin 31, secured in the disc 29, extends across the recess in the disc, the axis of the pin extending across the axis of the disc. Pivoted on the pin 31 and lying in the recess is the left-hand end of a driving rod 33. The driving rod 33 extends to the right from the pin beyond the right-hand end of the lower roll, this end of the roll having projecting from it a hollow trunnion 35 which is rotatably mounted in a bearing 37 for the right-hand end of the lower roll 3. The bearings 25, 37 for the lower roll 3 are arranged, as will hereinafter appear, to move up and down with the roll. The right-hand end of the driving rod 33 is pivoted on a pin 39 lying parallel to the pin 31 at the other end of the rod. The pin 39 is secured in a disc 41, similar to the disc 29, which has formed in it a recess in which is pivoted the right-hand end of the driving rod 33. The disc 41 is supported in a recess in the hollow hub of a gear 45 through which the lower roll 3 is driven. The lower roll 3 is driven by the gear through the discs, pins and rod, these forming a universal coupling between the roll and gear which permits the lower roll to rise and fall as well as to tilt endwise without disturbing its driving connection to the gear 44. The hollow hub 43 of the gear 45 is rotatably mounted in a bearing 47 secured on the machine frame, and the gear at its right-hand side has secured on it a circular plate 49 the right-hand side of which engages the side of the gear 13 on the upper roll and prevents the gear 45 from moving toward the right. The left-hand side of the gear 45 engages the end of the bearing 47.

The bearings 25 and 37 for the measuring roll 3 are slidingly mounted in vertical guideways formed in a block 51 secured to the machine frame and in the bearing 47, said guideways allowing the roll to move up and down but preventing it from being moved forwardly or rearwardly. The outer end face of each bearing 25, 37 is curved at 53 about a horizontal axis extending lengthwise of the machine and lying about one-eighth of an inch below the level of the top of the lower roll, the bearings extending a little way above this level. These curved faces 53 on the bearings engage vertical faces of the guideways and, while allowing the lower roll to tilt lengthwise, prevent the roll from moving endwise more than a very slight, practically negligible, distance endwise. Referring to Fig. 9 there is shown the roll 3 and its mounting, including the beam 55 to which the bearings 25 and 37 are fastened and the vertical rod 61 about the upper end of which the roll tilts. In this figure there is shown more in detail the relation of the curved faces 53 to the vertical faces against which they bear. The curves of these bearing faces are struck from a center located a little below the upper element of the roll, the distance from the vertical face of the bearing member 47 to that of the bearing block 51 being very slightly greater than the distance from one curved face 53 to the other so as to provide a clearance just sufficient to allow the roll to move bodily downward and to tilt lengthwise. It will be understood that the end-wise tilting movement of the roll is small and that the curved faces 53, except for the small clearance referred to above, are always in engagement respectively with the vertical faces on the block 51 and the bearing member 47. The upper and lower rolls 1, 3 are of the same diameter, the gear 45 of the lower roll meshing with the gear 13 of the upper roll and being rotated continuously, while the machine is in operation, by gearing which connects said gear 45 with the driving shaft 15 (Fig. 1) of the machine.

Figures 2, 4:
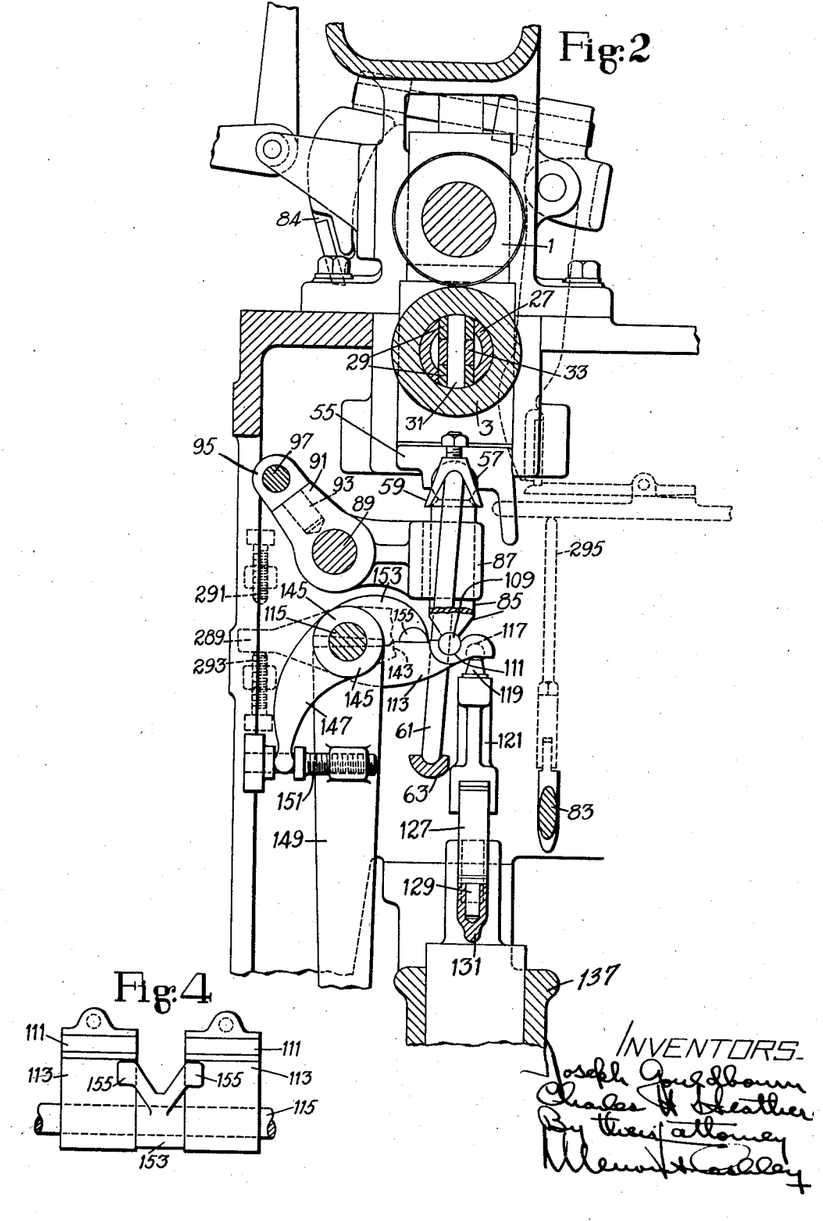
Fig. 2 is a right-hand side elevation, partly in section, of the thickness-measuring mechanism of the machine.
Fig. 4 is a plan view of the feeler arm located between the measuring arms and having two projections which engage respectively said measuring arms.

The lower measuring roll bearings 25 and 37 are secured on the upper face of opposite ends of a carrier in the form of a beam 55 extending from one bearing 51 to the other 47 directly beneath the measuring roll. The underside of the beam 55 has formed in it a groove 57 semi-circular in cross section which extends laterally of the machine. In the centre of this groove and directly below the centre of the measuring roll 3 there is secured an inverted cup-shaped member 59 in which is seated the rounded upper end of a support in the form of a rod 61. The rod 61 extends substantially vertically downwardly, and its lower and rounded end is seated in a recess in an arm 63 of a three-armed lever 65 which is pivoted on a horizontal shaft 67 extending lengthwise of the machine and secured in the machine frame. The arm 63 of the lever 65 extends towards the left from the shaft 67, viewing the machine from the front, and another arm 69 of the lever extends downwardly and has connected to its lower end one end of a tension spring 71. The other end of the tension spring 71 is connected to the lower end of an arm 73 which is pivoted on a horizontal shaft 75 extending lengthwise of the machine and secured in the machine at the left-hand side thereof, the arm 73 being outside the machine and having in it an adjustable screw 77 which is held by the spring 71 against the side of the frame. By adjusting the screw 77, the tension of the spring 71 may be adjusted. The spring 71 presses the lower roll 3 upwardly and, when no work is between the rolls, holds upper faces on the lower roll-bearings 25, 37 against plates 79, 81 secured respectively on the bearings 47 and 51, there then being a very small gap between the upper and lower rolls. A third arm 83 of the three-armed lever 65 extends from the hub of the lever towards the left to the outside of the frame, the arm 83 being about five times as long as the arm 63 of the lever which supports the rod 61. When the lower roll 3 is lowered away from the top roll, as a workpiece enters between the rolls, the two arms 63, 83 are both moved downwardly, the longer arm 83 acting through a rod 295 and other elements (not shown) to cause a gate 84 (Fig. 2) to drop on to the workpiece. This gate is a well-known feature of machines of this type, its purpose being, as it rides off the trailing end of a workpiece and drops farther, to prevent the presentation of a succeeding workpiece to the machine until the preceding workpiece has traveled a certain distance in the machine whereupon it is again raised.

The spring 71, through the lever 69 and the rod 61, holds up the lower measuring roll but permits said roll to yield bodily downward according to the average thickness of the workpiece and to tilt endwise according to difference in thickness between opposite portions of the edges of said piece. In order to make successively thinner portions in the edge of the workpiece, as they are encountered by the measuring mechanism, effective to adjust the operating mechanism, the groove 57 in the beam 55 has slidingly mounted in it the upper rounded ends of a pair of auxiliary supports in the form of vertical bars 85, one at each side of the rod 61 and equally spaced therefrom. The bars 85 pass downwardly through openings in a pair of arms 87 which are adjustably mounted on a horizontal shaft 89 extending laterally of the machine. The openings in the arms 87 engage each side of the bars 85 and support them laterally but allow the bars to swing forwardly and rearwardly. The arms 87 have formed on them bosses 91 which extend forwardly and upwardly at about sixty degrees to the horizontal. The bosses 91 have mounted in them downwardly and rearwardly extending studs 93 having at their upper ends heads 95 through which is screw-threaded a right- and left-hand screw-threaded rod 97. The rod 97 extends laterally of the machine and is rotatably mounted in the machine frame but is prevented from endwise movement therein. If the rod 97 is rotated in one direction the arms 87 and bars 85 are moved towards each other, and if the rod 97 is rotated in the opposite direction the arms 87 and bars 85 are moved apart. The right-hand end of the rod 97 has secured on it, outside the machine frame, a gear-wheel 99 (Fig. 1) which meshes with an idler gear-wheel 101 rotatably mounted on the machine frame, and the idler gear-wheel 101 meshes with a gear-wheel 103 which is secured on the right-hand end of a horizontal right- and left-hand screw-threaded shaft 105. Rotation of the shaft 105 in one direction or the other, as in the machine of the patent, causes workpiece-positioning guides 107 to be moved towards or from each other to suit the width of a workpiece to be fed to the machine and to guide the workpiece centrally between the measuring rolls considered lengthwise thereof. The arrangement in the present machine is such that, as the workpiece positioning guides 107 are adjusted towards or from each other, the bars 85 are simultaneously adjusted towards or from each other by a similar amount; and the bars 85 are so arranged that when they are so adjusted their upper ends engage the groove 57 in the beam substantially beneath but a little inside the edge of the workpiece, and their position heightwise is controlled by the thickness of the workpiece along its margin.

The lower ends of the bars 85 are rounded and have projecting from each side of them cylindrical portions 109 which are seated in semi-circular grooves 111, along which they can slide when the bars are adjusted as aforesaid, formed in the upper faces of a pair of measuring arms 113 which extend rearwardly from and are pivoted on a horizontal rotatably mounted shaft 115 extending laterally of the machine. The measuring arms 113 are urged upwardly by a spring-plunger 135 through mechanism hereinafter described and hold the upper ends of the bars 85 against the beam 55. When the lower roll 3 is moved downwardly, the arms 113 are moved downwardly, and if one end of the roll 3 moves down farther than the other end of the roll, owing to the workpiece being thicker at one side margin than the other, the arm 113 beneath that side margin moves down farther than the other arm.

Each measuring arm 113 just rearward of its connection to its bar 85 has in its underside a rounded recess 117 which is engaged by the upper rounded end of one of two pins 119, the pins being about three inches apart considered widthwise of the machine. The lower ends of the pins 119 are secured in the upper end of a triangular-shaped member 121, the pins being secured at the opposite ends of the top of the member. The lower end of the triangular-shaped member 121 has secured in it a stud 123 having a V-shaped downwardly extending lower end portion 125 the lower edge of which extends lengthwise of the machine. The V-shaped portion 125 of the stud 123 engages the bottom of a V-shaped recess formed in the upper end of a short link 127, the angle of the V-shaped recess being greater than the angle of the V-shaped portion of the stud so that the V-shaped portion and the link can swing relatively laterally of the machine. The lower end of the link 127 has formed in it an upwardly extending V-shaped recess extending lengthwise of the machine which is engaged by the upper V-shaped end of a stud 129 secured in the upper side of a pressure-lever 131 extending laterally of the machine. When there is no work between the measuring rolls, as in Fig. 3, the axes of the upper rounded ends of the pins 119 lie in the same horizontal plane, and the edges of the V-shaped portions of the studs 123, 129 lie in a vertical plane which passes centrally through the rolls considered axially thereof.

The pressure-lever 131 is urged upwardly by the spring-plunger 135, and if a workpiece of uniform thickness, considered widthwise thereof, is inserted between the measuring rolls, the rounded ends of the pins 119 and the V-shaped ends of the studs 123, 129 move downwardly without alteration of their relative positions. If, however, one side margin of the workpiece is thinner than the other, one pin will move downwardly farther than the other pin, and the triangular-shaped member 121 will swing laterally of the machine about the axis of the rounded end of that pin which is highest. This swinging of the triangular-shaped member 121 moves the stud 123 in its lower end to one side of the vertical plane and causes the link 127 to tip laterally about the edge of the stud 129 in the pressure-lever 131. The pressure-lever 131, at the left of the stud 129 viewing the machine from the front, is pivotally connected at 133 to the upper end of the vertical spring-plunger 135 which is slidingly mounted in a bracket 137 secured to the front of the machine frame. The plunger 135 is urged upwardly by a compression-spring, in the bracket below the plunger, and the force exerted by this spring may be adjusted by means of a vertical screw 139 (Fig. 1), in the bracket below the spring. The right-hand end of the pressure-lever 131 is connected by a universal coupling to the lower end of an upwardly extending link 141.

The purpose of the machine, as has been stated, is to split or even a workpiece such as a leather sole in accordance with the thinnest portion in a selected locality or extent of the edges thereof; and commonly the selected locality is the edge in the forepart of each sole. Owing to the fact that the pressure-lever 131 is pivoted at one end to the spring-plunger 135 and at the other end is connected to the link 141 by a universal coupling, the spring-plunger accomplishes two functions. It aids in supporting the measuring roll 3 and it moves the link up in response to thinner portions of the work and down in response to thicker portions. Assuming that the workpiece is a sole, such sole is commonly fed heel-first to the rolls, the lower measuring roll being depressed by the entrance of the sole between the rolls and thereafter rising and falling and tilting lengthwise in accordance with variations in the thickness of the edge portions of the sole. During the first part of the travel of the sole, before the measuring rolls encounter the beginning of the selected locality, the link 141 is free to be moved up in response to thinner portions encountered by the rolls and down in response to thicker portions; but, as soon as the selected locality is reached, the link 141 is prevented, as will presently be explained, from moving down while remaining free to move up. Thus, during the progressive measuring of the thickness of successive portions in the selected locality, the link 141 cannot move down. When, therefore, a thicker portion of the work is encountered by the measuring rolls, the pressure-lever 131 swings down about its universal coupling with the link 141. If, however, a thinner portion is encountered in the work, the lever 131 moves up and moves the link 141 upward. As will be explained presently, the successive upward movements of the link 141 are used to control the operation of a hydraulic valve-mechanism which in turn adjusts the rack-bar 16 (Fig. 1) and the splitting mechanism in accordance with thinner and thinner spots in the workpiece as they are encountered by the measuring rolls.

The upper end of the link 141 (Fig. 1) is connected by a universal coupling to the rear end of an arm 143 of a valve-controlling lever 145 (Figs. 2 and 3) which is secured on the shaft 115 on which the measuring arms 113 are pivoted. The valve-controlling lever 145 has a downwardly extending arm 147 which has a forked lower end. The shaft 115 has pivoted on it at the left of the valve-controlling lever 145 a downwardly extending arm 149 which has screw-threaded through a lug on it a forwardly and rearwardly extending screw 151 (see also Fig. 1). The screw 151 has formed on it collars which engage the forked lower end of the arm 147, and has on its forward end a head by means of which it may be adjusted. The shaft 115 has secured on it between the measuring arms 113 the hub of a rearwardly extending feeler-arm 153. The feeler-arm 153 has projecting laterally from its rear end at each side of the arm a projection 155 (Fig. 4) each of which projections 155 engages the upper face of one of the measuring arms 113. The spring-plunger 135 urges the left-hand end of the pressure-lever 131 upwardly and acts through the V-shaped end of the stud 129 to press the bars 85 upwardly against the beam 55. The spring-plunger 135 also acts to urge the right-hand end of the pressure-lever 131 to move downwardly about the V-shaped end of the stud 129 and, through the link 141, acts to urge the feeler-arm 153 downwardly towards the measuring arms 113.

If one end of the measuring roll 3 moves down farther than the other end of the roll when a workpiece enters or is passing between the rolls, owing to the workpiece being thicker at one side margin than the other, the measuring arm 113 beneath that end of the measuring roll will be moved down farther than the other measuring arm and will move down away from the projection 155 on the feeler-arm 153 which is above it, and the other projection on the feeler-arm will be held against the upper face of the other measuring arm, and the feeler-arm will therefore occupy a heightwise position in the machine which is determined by the thickness of the workpiece at the thinnest portion thereof which is then engaged by the rolls. As a workpiece passes between the rolls, the lower measuring roll may move upwardly or downwardly and tilt lengthwise if the workpiece varies in thickness, and the feeler-arm 153 will be controlled by that one of the measuring arms 113 which is highest and is beneath that end portion of the lower roll which is engaging the thinnest portion of the edge of the workpiece.

The downwardly extending arm 149 has pivotally connected to it, about midway of its length, by a horizontal laterally extending pivot 157 (Fig. 1), the forward end of a rearwardly extending rod 159. The rod 159 passes through and can slide in a block 161 (Fig. 5) which is pivoted about midway between the ends of a valve-lever 163. The upper end of the valve-lever 163 is pivotally connected to a piston 247 hereinafter referred to. Between the block 161 and a head 165 on the rod is a compression-spring 167 surrounding the rod. The compression-spring 167 holds a screw 169 (Fig. 5) in the lower end of the lever 163 against a cup-shaped member 171 on the forward end of an auxiliary valve 173 of a hydraulic valve-device. Stops 175 and 177 are provided to limit the movement of the auxiliary valve 173 in both directions. The auxiliary valve 173 is slidingly mounted in bushings 179, 181 which are secured in the forward end of a bore extending axially through a main valve-plunger 183 which is slidingly mounted in a valve-chamber in a bushing 185 secured in a bracket 187 on the machine frame. The adjacent ends of the bushings 179, 181 are a little distance apart so that a small chamber 189 is formed in the bore in the main valve-plunger 183. The front bushing 179, which projects from the forward end of the main valve-plunger, has formed along its outer surface small grooves along which fluid, e. g. oil, can flow from the small chamber and return to a fluid-reservoir of the machine.

The auxiliary valve 173 has a portion 191 which is reduced in diameter, and this reduced portion is slightly longer than the length of the rear bushing 181; and the rear end of the valve projects from the bushing into the bore in the main valve-plunger. The rear bushing 181 has formed in it fluid-passages 193 which pass from the centre of the bushing to its outside surface and which are in alignment with similar passages 195 formed in a reduced portion of the main valve-plunger 183 at the forward end of the latter. The passages 195 lead into a chamber 197 formed partly in the bushing 185 and partly in a cap 198 secured to the front end of the bushing 185. The function of the auxiliary valve 173 is to control the flow of liquid under pressure from the bore 240, later to be described, in the main valve-plunger 183 into the chamber 197, such flow acting to slide the main valve-plunger to the right. The main valve-plunger 183 has three other reduced portions 199, 201 and 203 which are separated by two larger portions 205, 207 of the plunger spaced apart along the plunger and has also a larger portion 209 at the rear end of the plunger. The three reduced portions 199, 201, 203 of the main valve-plunger 183, the faces at the ends of the reduced portions and the bore in the bushing 185 form three chambers 211, 213, 215 into which the fluid can flow. The centre chamber 213 is connected by a pipe 217 (Fig. 1) to a supply of fluid under pressure. The chambers 211, 215 at each side of the centre chamber 213 are connected to exhaust-passages 223, 225 in the bushing 185 leading through a pipe 227 to a reservoir from which it is pumped up again through the pipe 217 into the chamber 213. The rear end of the bore 240 in the main valve-plunger 183 is closed by a plug-screw 229 in the bore, and this end of the plunger is engaged by one end of a compression-spring 231 in a cap 233 secured on the rear end of the bushing 185. The other end of the compression-spring 231 is engaged by a disc 235 in the bore in the cap 233 against which bears the end of an adjustable screw 237. The bushing 185 has in it a hole 239 through which any fluid which leaks past the rear end of the main valve-plunger can return to the reservoir.

The bore in the bushing 185 has leading from it and extending upwardly in the bracket 187 upwardly directed fluid-passages 241, 243 which connect the bore with a piston-chamber 245, formed in the bracket 187. The openings of the passages into the piston-chamber are arranged one behind and the other in front of a piston 247 which is slidingly mounted in the piston-chamber. The openings shown at 249, 251 of the passages 241, 243 respectively into the bore in the valve-chamber are closed and opened by the portions 207, 205 of the main valve-plunger 183 which are just wide enough to close the openings. Leading from the chamber 213 into the bore 240 in the main valve-plunger 183 are ports 242 so that the bore 240 is always filled with liquid under pressure.

Figures 5, 6, 7, 8:
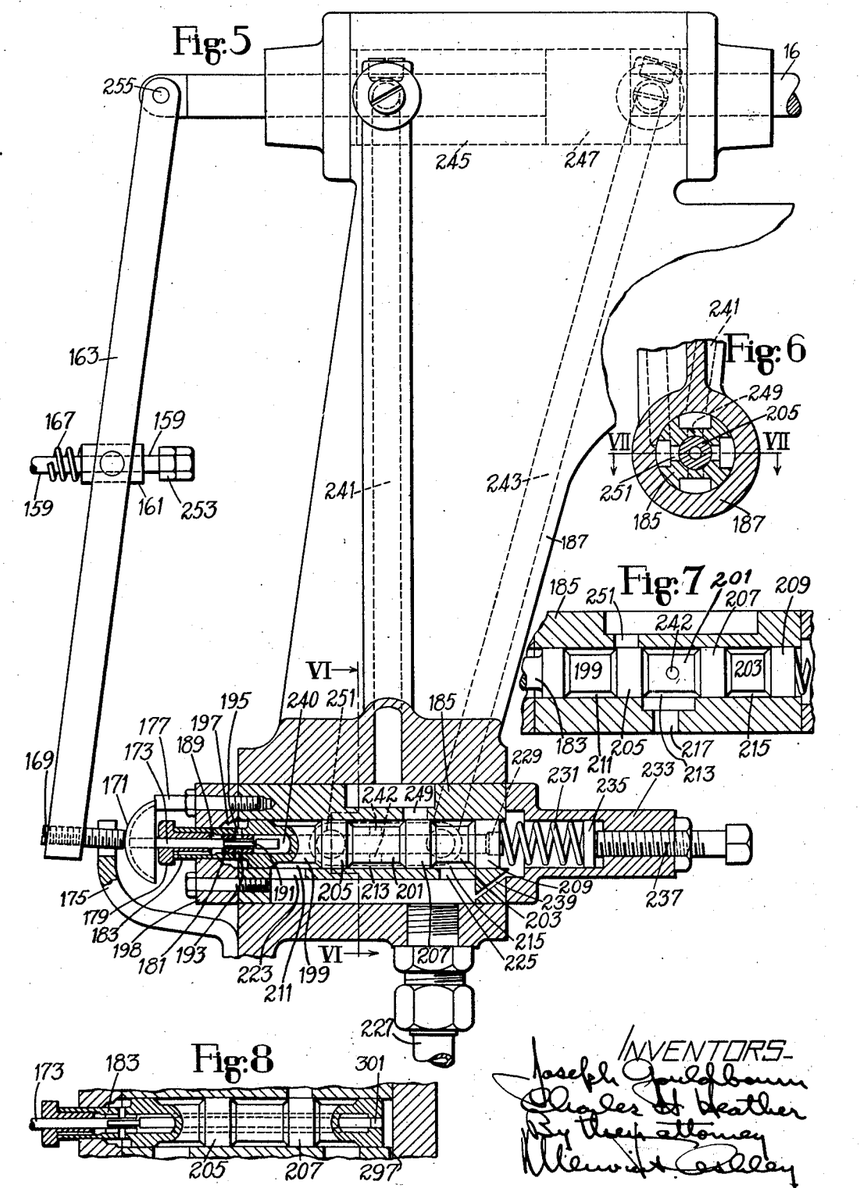
Fig. 5 is a right-hand side elevation, partly in section, of the fluid-operated mechanism of the machine.
Fig. 6 is a section on the line VI—VI in Fig. 5.
Fig. 7 is a sectional plan view on the line VII—VII in Fig. 6.
Fig. 8 is an elevation of an alternative valve arrangement of the machine.

When the main valve plunger 183 is in neutral position both these openings 249, 251 in the bore are closed, and if the main valve-plunger 183 is moved forwardly or rearwardly one passage is opened to allow fluid under pressure to flow up to one side of the piston 247 and the other passage is opened to allow fluid from the other side of the piston to flow down through one or the other of the exhaust passages 223, 225 and then back to the reservoir. The rear end of the piston is connected to the rack-bar 16 so that the rack-bar moves with it, the final position of the rack-bar determining the thickness to which the workpiece will be split. The minimum thickness to which the illustrative machine is arranged to split a workpiece is two irons. When no work is in the machine and the fluid is under pressure of about 120 pounds to the square inch, the screw 169 in the lower end of the aforesaid valve-lever 163 is holding the cup-shaped member 171 against the rear stop 177, as shown in Fig. 5, and the auxiliary valve 173 open and allows fluid-pressure to be exerted through the bore 193 in the rear bushing 181 in which the auxiliary valve 173 is mounted and through the chamber 197 to hold the main valve-plunger 183 in such a rearward position that fluid-pressure is exerted through the passage 241 on the front of the piston 247 and holds the piston rearwardly against a stop. When the piston is in this position the rack-bar 16 is at the end of its rearward movement. If the illustrative machine were to operate on a workpiece and no movement of the rack-bar took place from this position the workpiece would be split down to two irons in thickness.

In this position of the parts a nut 253 on the rod 159 is positioned a little rearwardly of the block 161 on the valve-lever 163. The nut 253 is usually set such a distance away from the block 161 that it does not engage the block until the measuring roll 3 has moved down the distance of two irons, i. e. one twenty-fourth of an inch, and therefore the auxiliary valve 173 is not actuated and the rack-bar 16 is not adjusted forwardly of the machine until after the measuring roll has moved down this distance. The distance of the nut 253 from the block 161 may be adjusted by means of the screw 151 (Fig. 1). This adjustment provides means whereby more or less material may be removed by the splitting knife from a workpiece of a measured thickness. If the nut is adjusted towards the block less material is removed and if it is adjusted away from the block more material will be removed.

When a workpiece which is thicker than two irons is inserted between the rolls of the measuring mechanism the downwardly extending arm 149 is swung forwardly and the nut 253 on the rod 159 swings the valve-lever 163 forwardly about its pivotal connection at 255, at its upper end, to the piston 247. This movement of the valve-lever 163 allows the fluid-pressure on the rear end of the auxiliary valve 173 to move the valve forwardly and to close it. The spring 231 at the rear end of the main valve-plunger 183 immediately moves the plunger forwardly, the fluid in the chamber 189 at the front of the plunger flowing out past the forward end of the reduced portion 191 of the auxiliary valve 173 which is then just forward of the rear bushing 181. This forward movement of the main valve-plunger 183 allows fluid to flow along the passage 243 to the rear of the piston 247 and causes the piston to move forwardly and the rack-bar 16 to move forwardly of the machine. As the main valve-plunger 183 moves forwardly it partly opens the auxiliary valve 173 by movement of the rear bushing 181 relatively to the valve; and, as the piston 247 moves forwardly, the lower end of the valve-lever 163 swings about its pivotal connection to the block 161. The movement of the lower end of the valve-lever 163 moves the auxiliary valve 173 rearwardly and opens the valve so far that the fluid is exerting sufficient pressure on the front end of the main valve-plunger 183 to balance the spring 231 and hold the main valve-plunger 183 in such a position that both passages leading from the valve-chamber to the piston 247 are closed by the main valve-plunger 183. In this position of the auxiliary valve, fluid can pass by the auxiliary valve along the reduced portion 191 to the reservoir. The pressure of the fluid on the front of the main valve-plunger and the spring are now in a balanced condition.

The piston 247 is now held against movement by the fluid at both ends of the piston and remains in this position until a change in thickness of the workpiece occurs as the workpiece passes between the measuring rolls. Soon after the leading end of the workpiece has passed through the measuring rolls locking means, hereinafter described, prevents forward swinging movement of the downwardly extending arm 149 in response to increases of thickness of the workpiece but allows rearward swinging movement of the arm in response to decreases in the thickness of the workpiece. If the workpiece decreases in thickness the measuring roll 3 will move upwardly, and the downwardly extending arm 149 will swing rearwardly and will further open the auxiliary valve 173. The fluid-pressure in the chamber 189 at the front of the main valve-plunger 183 will then be increased and will move the main valve-plunger 183 rearwardly and allow fluid to flow to the front of the piston 247 and move the piston and rackbar 16 rearwardly. As the main valve-plunger 183 moves rearwardly it partly closes the auxiliary valve 173, by movement of the rear bushing 181 relatively to said valve, and as the piston 247 moves rearwardly it swings the lower end of the valve-lever 163 forwardly and allows the auxiliary valve 173 to be moved so far forwardly, by the fluid-pressure, that the auxiliary valve is slightly closed, and the spring 231 moves the main valve-plunger 183 forwardly until the openings 249, 251 leading to the piston-chamber 245 are both closed and the auxiliary valve is so far open that the balanced condition of the fluid-pressure on the front of the main valve-plunger 183 and the pressure of the spring 231 on the rear of the plunger is restored. A very slight movement of the auxiliary valve 173 is sufficient to disturb the balanced condition, and the movement of the main valve-plunger 183 and piston 247 and the restoration of the balanced condition takes place with great rapidity, with the result that the device is extremely sensitive to variations in the thickness of the workpiece and responds rapidly to such variations.

If a workpiece should be of gradually decreasing thickness the repeated movements of the auxiliary valve 173 and the main valve-plunger 183 and the disturbance and restoration of the aforesaid balanced condition will take place with such rapidity that a practically continuous movement of the piston 247 rearwardly will take place.

The locking means, referred to above, which prevents forward movement of the downwardly extending arm 149 in response to increases in thickness of a workpiece which is passing between the rolls 1 and 3 comprises a forwardly and rearwardly extending ratchet-bar 257 (Fig. 1) which is secured to the machine frame. The upper face of the ratchet-bar 257 has formed on it ratchet-teeth which are engaged by a tooth extending downwardly from a pawl 259, said pawl extending forwardly from the lower end of the arm 149 to which it is pivoted by a horizontal stud 261, the ratchet-teeth being shaped to prevent forward movement of the pawl and arm.

A compression-spring 263 between the arm 149 and the pawl 259 urges the pawl downwardly. The forward end of the pawl 259 has extending laterally from it a stud 265 which passes through an upwardly extending slot 267 in the lower end of a rod 269. This rod is normally held up as shown to hold the pawl 259 up out of contact with the teeth on the ratchet-bar 257, and remains thus inoperative until the leading end of a workpiece has passed between the measuring rolls far enough so that the rolls are in engagement with the beginning of the selected locality of the workpiece. Commonly, as has been stated, the workpiece is a sole, the selected locality is the forepart of the sole, and the sole travels through the machine heel-end first. Until the pawl 259 engages the teeth on the ratchet-bar 257, the link 141 is free to move up and down in response to thicker portions of the workpiece, and the splitting mechanism is adjusted successively in accordance with the thickness of such portions. As soon, however, as the pawl is lowered, only successive decreases in thickness are effective to cause adjustment of the splitting mechanism. The upper end of the rod 269 is pivotally connected to the forward end of a substantially horizontal arm 271 which is secured on a horizontal shaft 273 extending laterally of the machine and rotatably mounted therein. The shaft 273 also has secured to it an upwardly extending arm 275 to which is pivotally connected a bar 277 slidingly mounted in the machine frame. The bar 277 has projecting laterally from it a lug 279 which is arranged to be engaged by an arm 281 secured on a shaft 283 which is rotatably mounted in the machine frame. The shaft 283 has projecting rearwardly from it a rod 285 which has adjustably mounted on it a shoe 287. This shoe, which is a well-known element of prior machines of the general type of the illustrative machine, is raised by the passage of the leading end of a workpiece beneath it and falls when it rides off from the trailing end of the workpiece, this rise and fall being caused to operate a pawl which functions like the pawl 259 of the illustrative machine. When, therefore, the shoe 287 is raised, the rod 269 is lowered, the pawl 259 engages the teeth of the ratchet-bar 257, and the splitting mechanism is adjusted only in accordance with successively thinner portions of the workpiece encountered by the measuring rolls.

The shaft 115 (Fig. 2), on which the measuring arms 113 are pivoted, has secured on its left-hand end outside the machine frame a forwardly extending arm 289 above and below which are arranged adjustable stop screws 291, 293. The lower of these screws, by limiting the upward movement of the arm 153 and therefore the measuring arms 113, prevents workpieces below a predetermined thickness from being operated upon, and the upper screw may be so adjusted that downward movement of the feeler-arm 153 is limited and workpieces which are thicker than a predetermined thickness are split down and marked to that predetermined thickness.

Since the illustrative machine includes means whereby the minimum thickness of a selected locality of a workpiece is measured and this measurement transferred to the mechanism by hydraulic means, the measuring roll 3 may be pressed up by a comparatively light pressure, its movement by engagement with the workpiece having only to operate the auxiliary valve 173 and release the gate 84. This comparatively light upward pressure of the measuring roll tends to avoid damage to the leading edge of the workpiece as it is fed to the rolls, and unnecessary upward pressure on the workpiece as it is being fed between the rolls is avoided, thus tending to make the measuring operation particularly sensitive.

Instead of the spring 231 which moves the main valve-plunger 183 forwardly, the auxiliary valve 173 may be extended rearwardly, as shown in Fig. 8, to form in conjunction with an opening 301 in the rear end of the main valve-plunger 183 another small valve which when the auxiliary valve 173 is moved forwardly will open and allow the fluid to pass to the rear end of the main valve-plunger and move the plunger forwardly. As the auxiliary valve 173 is moved rearwardly to allow the main valve-plunger to be moved rearwardly, the valve at the rear end of the main valve-plunger will close, and the fluid which is behind it will be allowed to escape through a small vent 297 to the reservoir as the plunger moves rearwardly. By this means the main valve-plunger will be moved both forwardly and rearwardly by the fluid-pressure.

Having thus described the invention, what we claim as new and desire to secure by Letters Patent of the United States is:

1. A machine of the class described having in combination measuring mechanism movable in response to variations in the thickness of a piece of work passing through the machine, operating mechanism, and mechanism including fluid-operated means actuated by the movements of the measuring mechanism for adjusting the operating mechanism in accordance with the thinnest portion of a selected locality of the work encountered by the measuring mechanism.

2. A machine of the class described having in combination a measuring roll over which the work passes, a support for the roll including means for permitting said roll to yield bodily and to tilt endwise in accordance with variations in thickness of a selected locality in the work, operating mechanism, and means including a fluid-operated piston and a fluid-operated valve adapted to control the movements of the piston for adjusting the operating mechanism in accordance with the thickness of the thinnest portion of the selected locality of the work encountered by the roll.

3. A machine of the class described having in combination measuring mechanism responsive to variations in the thickness of a piece of work passing through the machine, operating mechanism, means including a setting member for adjusting the operating mechanism, a cylinder, a piston in the cylinder movements of which adjust the setting member, a source of fluid under pressure, a main valve for controlling the flow of fluid to one or the other end of the cylinder, an auxiliary valve for causing movement of the main valve, and a member movable in accordance with movements of the measuring mechanism as thinner portions of the work are encountered for controlling the operation of the auxiliary valve.

4. A machine for operating upon a piece of work in accordance with the thinnest spot in a selected locality, said machine comprising operating mechanism, measuring mechanism, and means for adjusting the operating mechanism in accordance with the determinations of the measuring mechanism, said measuring mechanism including a measuring roll over which the work passes, a support for the roll including means for permitting said roll to yield bodily and to tilt endwise and means engaging the roll at a locality substantially equidistant from its ends for rotating it.

5. A machine for operating upon a piece of work in accordance with the thinnest spot in a selected locality, said machine comprising operating mechanism, measuring mechanism, and means for adjusting the operating mechanism in accordance with the determinations of the measuring mechanism, said measuring mechanism including a hollow measuring roll over which the work passes, a support for the roll including means for permitting said roll to yield bodily and to tilt endwise and means located within the roll at a locality substantially equi-distant from its ends for rotating it.

6. A machine for operating upon a piece of work in accordance with the thinnest spot in a selected locality, said machine comprising operating mechanism, measuring mechanism, and means for adjusting the operating mechanism in accordance with the determinations of the measuring mechanism, said measuring mechanism including a hollow measuring roll over which the work passes, a support for the measuring roll including means for permitting said roll to yield bodily and to tilt endwise, a driving rod extending into the roll, a universal joint connecting the inner end of the driving member with the roll and means including a universal joint connected with the outer end of the driving rod for rotating it.

7. A machine for operating upon a piece of work in accordance with the thinnest spot in a selected locality, said machine comprising operating mechanism, measuring mechanism, and means for adjusting the operating mechanism in accordance with the determinations of the measuring mechanism, said measuring mechanism including a measuring roll over which the work passes, a carrier for the bearings of the measuring roll, a rod which is substantially perpendicular to the axis of the roll and the upper end of which engages the carrier substantially in line with the center of the roll and a yielding member for supporting the lower end of the rod whereby the roll may yield bodily and may tilt endwise.

8. A machine of the class described having in combination a measuring roll over which the work passes, said roll being mounted for bodily and for endwise tilting movement, a yielding member, connections between said member and said roll, a rod substantially perpendicular to the axis of the roll for supporting said yielding member, said rod being mounted for bodily and for swinging movement whereby the yielding member partakes of the bodily and tilting movements of the roll, operating mechanism, and means dependent upon the bodily and angular position of the yielding member for adjusting the operating mechanism.

9. A machine of the class described having in combination a measuring roll over which the work passes, said roll being mounted for bodily and for endwise tilting movement, a carrier for the bearings of the roll, said carrier having a groove which is parallel to the axis of the roll, two spaced bars substantially perpendicular to the axis of the roll having one of their ends in the groove, two spaced arms upon which the other ends of the bars respectively rest, pins engaging respectively the under sides of the arms, a member by which the pins are carried, a yielding support for said member adapted to permit said member to move bodily and to tilt in accordance with the bodily and tilting movements of the roll, operating mechanism, and means dependent upon the bodily and angular position of said member for adjusting said operating mechanism.

10. A machine of the class described having in combination a measuring roll over which the work passes, a carrier for the bearings of the measuring roll, a rod which is substantially perpendicular to the axis of the roll and the upper end of which engages the carrier substantially in line with the center of the roll, a yielding member for supporting the lower end of the rod whereby the roll may yield bodily and may tilt endwise, two spaced yieldingly mounted supports engaging the carrier one on each side of said rod at localities substantially in line respectively with the edges of the work, said two spaced supports being capable of occupying different levels whereby their positions, as the work passes the measuring roll, depend upon both the bodily and the tilting movements of the roll, operating mechanism, and means for adjusting the operating mechanism successively in accordance with successively higher positions occupied by either of said two spaced supports in response to variations in thickness of the edges of the work.

11. A machine of the class described having in combination a measuring roll over which the work passes, said roll being mounted for bodily and for endwise tilting movement, a carrier for the bearings of the roll, two spaced supports for the carrier, two spaced guides for engaging the opposite edges of the work as it passes between the rolls, each support being substantially alined with one of the guides, a single means for adjusting the guides and the supports to accommodate work of different widths while still preserving the alined relation between each support and its corresponding guide, a member by which the supports are sustained, said member partaking of the bodily and tilting movements of the measuring roll, operating mechanism, and means dependent upon the bodily and tilted position of said member for adjusting the operating mechanism.

12. A machine of the class described having in combination measuring mechanism movable in response to variations in the thickness of a piece of work passing through the machine, operating mechanism, and means including a fluid-operated piston actuated by the movements of the measuring mechanism for adjusting the operating mechanism in accordance with the thinnest portion of a selected locality of the work encountered by the measuring mechanism.

13. A machine of the class described having in combination measuring mechanism including a member movable as thinner portions of the work are encountered by it, adjustable mechanism for operating upon the work, mechanism including fluid-operated means for adjusting the operating mechanism in accordance with the thinnest portion of a selected locality of the work encountered by the movable member of the measuring mechanism, said fluid-operated means including a piston and a valve to control flow of fluid to said piston, and mechanism responsive to movements of said movable member for operating the valve.

JOSEPH GOULDBOURN.
CHARLES HAROLD HEATHER.